United States Patent

Svendsen

(10) Patent No.: US 9,161,494 B2
(45) Date of Patent: Oct. 20, 2015

(54) BALE OPENER FOR BIOMASS ENERGY PLANTS

(75) Inventor: Jens Jørgen Svendsen, Allerød (DK)

(73) Assignee: Burmeister & Wain Energy A/S, Lyngby (DK)

( * ) Notice: Subject to any disclaimer, the term of this patent is extended or adjusted under 35 U.S.C. 154(b) by 698 days.

(21) Appl. No.: 13/139,160

(22) PCT Filed: Dec. 11, 2009

(86) PCT No.: PCT/DK2009/050333
§ 371 (c)(1), (2), (4) Date: Jun. 10, 2011

(87) PCT Pub. No.: WO2010/066258
PCT Pub. Date: Jun. 17, 2010

(65) Prior Publication Data
US 2011/0240780 A1    Oct. 6, 2011

(30) Foreign Application Priority Data
Dec. 12, 2008  (EP) .................................... 08171471

(51) Int. Cl.
  *B02C 18/06*  (2006.01)
  *A01F 29/00*  (2006.01)
  *A01F 29/02*  (2006.01)

(52) U.S. Cl.
  CPC ............... *A01F 29/005* (2013.01); *A01F 29/02* (2013.01); *B02C 18/06* (2013.01)

(58) Field of Classification Search
  CPC ........ B02C 18/02; B02C 18/06; B02C 18/00; B02C 19/00; B02C 13/286; A01F 29/00; A01F 29/005; A01F 29/02
  USPC .............. 241/261, 605, 227, 236, 273.1, 277, 241/282.1, 291, 292.1, 300, 218, 174, 133, 241/101, 191, 194, 189.1, 220, 34, 185.5, 241/59, 127, 186.4, 166, 222
  See application file for complete search history.

(56) References Cited

U.S. PATENT DOCUMENTS 1,945,733 A * 2/1934 Court .............................. 56/500
2,188,522 A * 1/1940 Alfs ................................. 56/60

(Continued)

FOREIGN PATENT DOCUMENTS

DE   32 09 885 A1   9/1983
DE   3209885   *   9/1983 ............... A01F 29/00

(Continued)

*Primary Examiner* — Mark Rosenbaum
(74) *Attorney, Agent, or Firm* — Nath, Goldberg & Meyer; Jerald L. Meyer (57) ABSTRACT

Bale opener for use in a feeding line of a biomass energy plant, the bale opener (1) comprising at least two disintegration members (2), wherein each disintegration member (2) is rotatable around a respective rotation axis (5) and in the direction of that rotation axis (5) has a first end (3) and a second end (4), an inlet (17) for feeding bales (28) in a feeding direction (33) to the disintegration members (2), an outlet (18) for discharging loosened bale material from the disintegration members (2), a drive system (6) being operable to drive the disintegration members (2) to rotate around their respective rotation axis (5), wherein each disintegration member (2) is provided with a plurality of blades (8) that are radially disposed in a mill-wheel arrangement, the blades (8) extending outwardly from a radially inner edge (9) to a radially outer edge (10) and from a first edge (11) at the first end (3) of the disintegration member (2) to a second edge (12) in a direction towards the second end (4) of the disintegration member (2), and that the inlet (17) is arranged opposite to the first end (3) of the disintegration members (2) so as to feed the bales (28) to a processing region (34) at the first end (3) of the disintegration members (2).

19 Claims, 3 Drawing Sheets

(56) References Cited

U.S. PATENT DOCUMENTS

| | | | |
|---|---|---|---|
| 2,873,779 A * | 2/1959 | Eykamp | 241/277 |
| 3,129,739 A * | 4/1964 | Wenger | 241/55 |
| 4,411,573 A * | 10/1983 | Townsend | 414/24.6 |
| 4,830,292 A * | 5/1989 | Frey | 241/101.76 |
| 4,934,615 A * | 6/1990 | Osborne | 241/186.4 |
| 4,951,883 A * | 8/1990 | Loppoli et al. | 241/101.762 |
| 5,033,683 A * | 7/1991 | Taylor | 241/101.2 |
| 5,215,266 A * | 6/1993 | Zimmerman | 241/101.76 |
| 5,272,861 A * | 12/1993 | Roynberg | 56/504 |
| 7,322,537 B2 | 1/2008 | Faccia | |
| 7,967,231 B2 * | 6/2011 | Post et al. | 241/277 |
| 2003/0070779 A1 * | 4/2003 | Bransby | 162/97 |
| 2004/0108398 A1 * | 6/2004 | Lepage | 241/55 |
| 2006/0086849 A1 * | 4/2006 | Weiss | 241/101.76 |

FOREIGN PATENT DOCUMENTS

| | | | | |
|---|---|---|---|---|
| DK | 1 73 159 B1 | | 2/1996 | |
| EP | 0 371 681 A1 | | 6/1990 | |
| EP | 0 568 961 A2 | | 11/1993 | |
| EP | 0568961 | * | 11/1993 | A01F 29/00 |
| EP | 0 694 251 A1 | | 1/1996 | |
| EP | 1 245 142 A1 | | 10/2002 | |
| GB | 2070401 | * | 0/1881 | A01C 3/06 |
| GB | 2129286 | * | 10/1979 | A01F 29/00 |
| GB | 2 070 401 A | | 9/1981 | |
| GB | 2 129 286 A | | 5/1984 | |

* cited by examiner

BALE OPENER FOR BIOMASS ENERGY PLANTS

This is a National Phase Application filed under 35 U.S.C. 371 as a national stage of PCT/DK2009/050333, filed on Dec. 11, 2009, an application claiming benefit from European Application No. 08171471.9, filed on Dec. 12, 2008, the entire content of each of which is hereby incorporated by reference in its entirety.

TECHNICAL FIELD

The invention relates to a bale opener for use in a feeding line of a biomass energy plant, the bale opener comprising at least two disintegration members being rotatable around a rotation axis defining an axial direction, the disintegration members having in the axial direction a first end and a second end, an inlet for feeding bales in a feeding direction to the disintegration members, an outlet for discharging loosened bale material from the disintegration members, and a drive system being operable to drive the disintegration members to rotate around their respective rotation axis.

BACKGROUND

Biomass is considered an important source of energy. Particularly interesting candidates for exploiting the energy contained in biomass, e.g. for the production of heat or electrical energy, are biological materials that are otherwise considered as a waste product of agricultural crops, such as straw, corn stalks, or the like. At harvest, these biomaterials are dried, compressed and bound into bales suitable for transportation and storage.

A biomass energy plant may be a plant or installation for immediate energy production from biomaterials, such as heat or electrical energy, or may be a plant for the production of fuels for energy generation at a later stage. Examples of such biomass energy plants are a straw-fired boiler, a bio-ethanol production plant or a biomass pellet production plant. At industrial scale, such biomass energy plants require a large amount of dried biomaterial to be supplied at a fast rate. For example in a straw-fired energy plant, production rates may easily reach thirty tons per hour.

Biomaterial is usually delivered to and stored at the site of such biomass energy plant in the form of bales. For production, the bales are conveyed to the production unit of the plant via one or more feeding lines. In the feeding line, the biomaterials are processed into a form suitable to be supplied to the production unit of the plant.

This processing is performed using a bale opener for breaking up the bales and effectively loosening the biomaterial gently, but at a high rate suitable for industrial scale production, while avoiding lumps of compressed biomaterial that might choke the supply mechanism of the production unit, for example the stoker of a straw fired boiler.

Other problems that are particularly pronounced in industrial scale set-ups operating at high production rates and that are to be avoided is generation of sparks and/or the entanglement of bale packaging materials, in particular bale strings, in the mechanism of the feeding line.

Different types of equipment for processing bales of biomaterial for use in e.g. a straw fired burner are known in the art.

DE 32 09 885 discloses a straw bale comminution device for supplying a straw fired central heating boiler. The comminution device involves a single rotating disk cutting the straw by means of knives radially arranged thereon, the knives cooperation with edges of corresponding holes in a stator disk to provide a scissor action. Such a construction involving a comminution type processing mechanism requires frequent attention in order to maintain the knives sharp, and remove frequently encountered contaminants, such as stones, branches or even metal parts jammed in the comminution mechanism, here typically between the rotating disk and the stator disk, and in particular bale packaging materials, such as bale strings, entangled therein. Furthermore, when operating the device according to DE 32 09 885, a core of unprocessed material tends to build up in the central part around the rotation axis, thus leading to congestion in the feeding hopper. To avoid such a core from building up, additional cutting means may need to be provided at the hub part in the centre. Such cutting means rotating in the centre are particularly prone to catching bale strings subsequently getting entangled in the rotating parts.

A bale opener of the type mentioned in the introduction above is known from DK 173 159. DK 173 159 discloses a breaking-up device with at least two breaking-up means that are shaped as a body of revolution carrying a helicoid on the surface. The at least two breaking-up means are arranged next to each other and are at one end supported by bearings. The breaking-up means are operable to be rotated in such direction that the transport direction of the helicoid is directed away from the bearings. The configuration disclosed in DK 173 159 has the drawback that under operational conditions a considerable tilting load may occur in a transverse direction of the bearings of the breaking-up means. When mounted in connection with a feeding channel, the breaking-up device of DK 173 159 is hinged on a spring-loaded support such that the breaking-up device may swing away from the end of the feeding channel and give way to the pressure exerted on the breaking-up means by the straw bales conveyed thereto. The hinged support allows lumps of compacted straw to bypass the breaking-up device.

DISCLOSURE OF THE INVENTION

The object of the invention is to provide a device for breaking-up and loosening compacted biomaterial for use in a biomass energy plant, the device overcoming the above-mentioned draw-backs and being adapted to continuously supply loosened biomaterial to a production unit of the biomass energy plant.

This is achieved by a bale opener for use in a feeding line of a biomass energy plant according to the invention, the bale opener comprising at least two disintegration members, wherein each disintegration member is rotatable around a respective rotation axis and in the direction of that rotation axis has a first end and a second end, an inlet for feeding bales in a feeding direction to the disintegration members, an outlet for discharging loosened bale material from the disintegration members, a drive system being operable to drive the disintegration members to rotate around their respective rotation axis, wherein each disintegration member is provided with a plurality of blades that are radially disposed in a mill-wheel arrangement, the blades extending outwardly from a radially inner edge to a radially outer edge and from a first edge at the first end of the disintegration member to a second edge in a direction towards the second end of the disintegration member, and wherein the inlet is arranged opposite the first end of the disintegration members so as to feed the bales to a processing region at the first end of the disintegration members.

On each disintegration member, the blades are arranged radially around the rotation axis, the blades stretching in a direction along the rotation axis. The first edges of the blades are located at the first end of the disintegration member and radiate outwardly from the rotation axis towards the periphery of the disintegration member. The radially inner edge of each of the blades extends in a direction along the rotation axis. At the periphery of the disintegration member, the radially outer edge of each of the blades extends in a direction along the rotation axis from the first edge to the second edge of the respective blade. The second edges are located at a distance from the first end, in the direction towards the second end and radiate outwardly from the radially inner edge to the radially outer edge. Preferably, a disk shaped back plate is provided at the second end of the disintegration member and the second end of each of the blades is attached thereto to reinforce the disintegration members.

The disintegration members are driven so as to rotate in order to sweep the blades of the disintegration members across the processing region at the first end of the disintegration members, thereby breaking up and loosening the straw bales by interaction with the edges of the blades as the straw bales are supplied to the bale opener via the inlet to the first end of the disintegration members. Particularly the first edges of the blades interact with the bales engaging the end of the bales facing towards the disintegration members and breaking off and loosening compressed material from the bales as the blades move across the processing region. The interaction provides for a kind of processing that merely loosens the biomaterial from its compressed state in the bale, thereby disintegrating the bale rather than cutting or otherwise comminuting the biomaterial. The blades are configured to engage the bale strings for breaking these, but are shaped in order to avoid the bale strings getting caught and entangled in the rotating machinery. Unless the bale strings are incompatible with the processes following the bale opening, no separate bale string removal apparatus is thus required, yet ensuring reliable high throughput operation of the bale opener.

Under operation, the rotating disintegration members sweep the first edges in a scraping movement across the cross-section of the bales, wherein the first edges are moved in the direction of rotation, i.e. in a direction transversely of the first edges.

The processing region may thus be defined as the region of interaction between the blades of the rotating disintegration members and the bales that are supplied to the first end of the disintegration members through the inlet of the bale opener. Ideally, the processing region is in lateral directions, i.e. in directions perpendicular to the axial direction defined by the rotation axes, dimensioned to cover substantially the full cross-section of the bales for the loosening of material by interaction with the blades, thereby avoiding that material breaks off the bales in lumps in regions that otherwise are not covered by the rotation of the disintegration members. In practice, a compromise may be required between achieving a substantially full coverage and the total requirement for space of the bale opener. In these cases, the processing region should preferably cover substantially the full width of the bale, at least at the lower edge of the bale as seen in the direction of gravity.

The processing region is with respect to the disintegration members located such that all disintegration members in a region at their respective first end can interact with the bales for breaking up the compressed layers and loosening the compacted biomaterial. The processing region is arranged such that the rotation axes of the disintegration members do not intersect the processing regions. Thereby the formation of plugs at the axis of rotation is effectively avoided, thus reducing the risk for congestion in the feeding line and consequently improving up-time of the system.

In practical situations, the rotation axis may be a hub/shaft/welding seam or the like having a finite diameter. Therefore, the contour/periphery of the processing region is placed at a given distance from the axis of rotation taking into account the finite diameter and typical alignment tolerances for conveying bales, here to the feeding inlet of the bale opener.

The disintegration members may counter-rotate and gear into each other such that the first edges of the blades from both disintegration members are swept in the same direction across the processing region, typically towards the outlet of the bale opener.

Preferably, the processing region is located between the rotation axes, and the distance between the two rotation axes as measured at the first ends is larger than the dimension of the processing region in that direction.

In certain cases, the actual processing region may be located slightly above or slightly below the direct connecting line between the rotation axes at the first end.

Furthermore, in certain cases it may be desirable to tilt the rotation axes with respect to each other. Thereby, an improved breaking of the compacted layers of the bales may be achieved. In such cases, the processing region has a more complex configuration that is substantially defined by the intersection of the planes of rotation at the first end of each of the rotating disintegration members with the cross-section of the bales as projected in the feeding direction.

The blades of the disintegration members are radially arranged around the rotation axis such that the body of the blades extends in a direction outwardly from the rotation axis and in a direction along the rotation axis like vanes on a mill-wheel. Preferably, the surface of the blade faces towards a substantially tangential direction.

The volume between the first end and the second end of the disintegration members is swept by the body of the blades. The loosened biomaterial/straw falling from the processing region into this volume is collected/caught by the body of the blades, and transported with the movement of the blades in a transport direction substantially tangential to the rotating motion of the blades towards the outlet of the bale opener. Finally, the loosened biomaterial is discharged from the bale opener via the outlet from where the loosened material may be transferred and fed to the production unit of the biomass energy plant.

According to a further embodiment of the bale opener, the blades are planar plates. The blades may extend in the radial direction or be placed at an angle with a radial direction. Using planar plates has the advantage that the blades of the disintegration members are easy to produce.

According to another embodiment of the bale opener, the blades are curved plates, preferably forming a convex surface in the direction of rotation.

Under operation, considerable operational load is exerted on the blades, due to the scraping interaction of the blades with the bales and because of the pressure build-up that may occur as loosened material is pushed towards the outlet. By giving the body of the blades a curved shape that is either convex or concave as seen in the direction of the movement of the blade, the strength of the blade for withstanding above-mentioned operational load is increased. Preferably, the surface pointing in the direction of motion of the blade due to the rotation of the disintegration member has a convex shape. This has the further advantage that the loosened material is more easily removed from the disintegration members.

According to further embodiment of the bale opener, the first edges of the blades are provided with means for engaging with the bale and/or means for breaking bale strings.

Under practical conditions, the efficiency of the process of breaking up the bale and loosening the biomaterial is enhanced by providing means for engaging with the bale. Furthermore, by providing means for breaking bale strings or other bale packaging material the opening of such bail strings and/or bale packaging materials can be performed in the same step as the breaking-up and loosening of the compressed biomaterial.

Advantageously, according to one embodiment of the above-mentioned bale opener, the means for engaging with the bale and/or the means for breaking the bale strings are indentations and/or projections on the first edges of the blades.

The projections/indentations are to be formed as blunt shapes so as to avoid that bale strings entangle in the rotating disintegration members. A number of different shapes of projections/indentations may be arranged along the first edge of a blade thereby forming a blunt processing profile. The processing profile of each blade works the surface of the bale as it is swept through the processing region, thereby breaking the internal structure of the bale and loosening the compressed material.

Furthermore, when engaging the surface of a new bale, the projections may engage with the bale strings and apply a force to break the bale strings. A processing profile with blunt shapes largely reduces the probability that the bale strings get caught by the blades and entangle with the disintegration members.

Advantageously, different blades may be provided with different processing profiles, thereby alternately acting on different parts of the bale as the different blades are moved over the surface of the bale. This enhances the massaging effect of the projections/indentations for breaking the bale structure and loosening the compressed biomaterial.

The radially outer edge of the blades may be formed by a combination of linear and curved shapes smoothly connecting with the blunt processing profile. Advantageously, the overall direction of the radially outer edge is inclined towards the rotation axis as seen in the direction from the second end towards the first end. Thereby, it is achieved that bale strings that might get caught on the radially outer edge of the blades will tend to slide off the disintegration members in a direction towards the first end where they may fall off.

According to a further embodiment of the invention, the number of blades is between two and ten, alternatively between four and six. The choice of the number of blades is determined by a compromise between achieving an efficient breaking up of the bales suggesting a large number of blades and providing sufficient space for the loosened material to be collected and transported away suggesting a low number of blades, as a large number of blades will take up this space. In practice, a number greater than or equal to two and smaller than or equal to ten is suitable; alternatively, a number greater than or equal to three and smaller than or equal to six has turned out to be advantageous.

According to a preferred embodiment of the invention, a bale opener has two disintegration members with substantially parallel rotation axes, the disintegration members being arranged to gear into each other under operation so as to sweep the blades of both disintegration members through an overlap volume.

Since the disintegration members gear into each other, they have to move in a counter rotating manner. In the region between the rotation axes the blades move in the same direction, thereby moving the loosened biomaterial away from the processing region and towards the outlet in a common transport direction.

Furthermore, the overlapping configuration has the advantage that for a given cross-section of the processing area, a more compact construction may be achieved as compared to a design with a single disintegration member.

More complex constructions comprising more than two disintegration members may also be conceived, but this adds to system complexity usually resulting in a more demanding set-up in terms of cost, reliability, maintenance and/or repair.

According to a further preferred embodiment of the invention, means for synchronising the movement of the two disintegration members are provided in the drive system.

Thereby, the disintegration members may be driven to gear into each other without touching each other. Such means for synchronising the movement of the two disintegration members may be cooperating synchronisation gears that are arranged in the respective drive trains of the wheels.

According to one embodiment of a bale opener with two overlapping disintegration members, the processing region is located between the rotation axes.

Thus, a first dimension of the processing region in the direction of the distance between the rotation axes is smaller than the distance between the rotation axes. Ideally, a second dimension of the processing region in a second direction perpendicular thereto may be smaller than the distance between the intersection points of the circumferences of the disintegration members, thereby covering the full cross-section of a bale fed to the processing region.

In practice, in order to reduce the requirement for space of the bale opener, the dimension of the bale in the second direction may be larger than the distance between the intersection points of the circumferences of the disintegration members, so that the processing region does not fully cover the cross-section of the bale. In such case, the bales are preferably fed to the bale opener so that the processing region covers substantially the full width of the bale, at least at the lower edge of the bale as seen in the direction of gravity.

During the processing of a bale, material is broken off and moved from two opposing sides of the bale in a lateral direction towards the centre, then in an axial direction into the volume adjacent to the processing region and equally located between the rotation axes, and then again in a lateral direction away from said volume towards the outlet of the bale opener. On its way from the inlet through the bale opener to the outlet, the biomaterial is forced to undergo numerous changes of direction, thereby achieving an efficient loosening of the biomaterial, which is important for the subsequent use of the biomaterial in the production unit of the biomass energy plant.

Preferably, according to one embodiment of the invention, the disintegration members are arranged inside a housing having a first opening and a second opening, the first opening of the housing forming the inlet of the bale opener opposite the first end of the disintegration members and the second opening in the housing forming the outlet of the bale opener.

The housing provides a safety screen for reducing hazards for personnel working in its vicinity, guides the flow of material loosened from the bales, and provides a shield against dust and dirt released during the process.

According to a further embodiment of a bale opener, the drive system is arranged on the outside of the housing. In this embodiment, moving parts other than those intended for the interaction with the bales and the biomaterial are kept outside the disintegration chamber formed by the housing. This has advantages for the reliability and maintenance of the drive system. Furthermore, by keeping the drive system outside the housing, the drive system, the drive engine or any mechanical parts that may overheat are separated from the inflammable biomaterial, thereby reducing fire hazards in the system.

Advantageously according to one embodiment of the invention, a feeding channel is provided in connection with the inlet, the feeding channel defining the feeding direction. A feeding channel guides and holds the bales on their way to the bale opener. In particular the bale being processed is subject to considerable mechanical forces. Holding and guiding in particular the bale being processed in a feeding channel dimensioned to fit closely around bales of standardised dimensions are therefore advantageous.

Further according to the invention, the rotation axis of the disintegration members is arranged horizontally and the feeding direction is inclined in an upward direction thereto as seen in the direction towards the inlet.

In practice, bales are compressed in layers. In cuboid-shaped bales these layers are typically parallel to two opposing end faces of the bale. By forming an angle between the rotation axis and the feeding direction, the blades of the disintegration members process the compression layers at an angle as well so as to process a number of compression layers at the same time. Consequently, the disintegration members break up and loosen the compressed layers of the bales efficiently and avoid that material leaves the bale opener in lumps.

Feeding the bales to the bale opener in an upward direction has the advantage that the lower edge of the bale end facing towards the disintegration members is processed first, thereby ensuring that lumps of compressed layers that may fall off during the process pass through the processing region and are loosened by interaction with the rotating disintegration members.

Further according to an embodiment of the invention, the angle between the feeding direction and the rotation axis is between 10 degrees and 30 degrees, alternatively between 15 degrees and 20 degrees, and preferably about 17 degrees.

In practice, a feeding angle between 10 and 30 degrees yields good results. For commonly available cuboid-shaped bales of the Hesston-type, an angle of between 15 and 20 degrees, preferably about 17 degrees, has turned out to work well.

According to a further aspect of the invention, a feeding line of a biomass energy plant comprises a bale opener according to the above-mentioned embodiments.

A feeding line according to the invention establishes a continuous supply of loosened material to the production unit of the biomass energy plant. Using a bale opener as defined above has the advantage that the supply rates required for the use in a biomass energy plant can be achieved and maintained. The bales may be retrieved from a bale storage facility in an automated manner, conveyed towards the inlet of the bale opener using a conveyor line arrangement connected to the inlet. The bales are continuously opened and disintegrated to continuously provide loosened biomaterial through the outlet of the bale opener to a feeding mechanism of the production unit of the biomass energy plant, such as a stoker of a straw-fired boiler.

BRIEF DESCRIPTION OF THE DRAWINGS

In the following, the invention is explained in detail by way of example with reference to the drawing, wherein like numerals refer to like parts. The drawing shows in FIG. 1 a side view of a bale opener according to the invention with a feed channel connected to the inlet, FIG. 2 a front view of the bale opener of FIG. 1 with the front cover of the housing removed, FIG. 3 schematically, an embodiment of a disintegration member for a bale opener according to the invention, and in FIG. 4 a side view of a disintegration member with blades with different processing profiles.

DETAILED DESCRIPTION OF THE INVENTION

Figure 1:
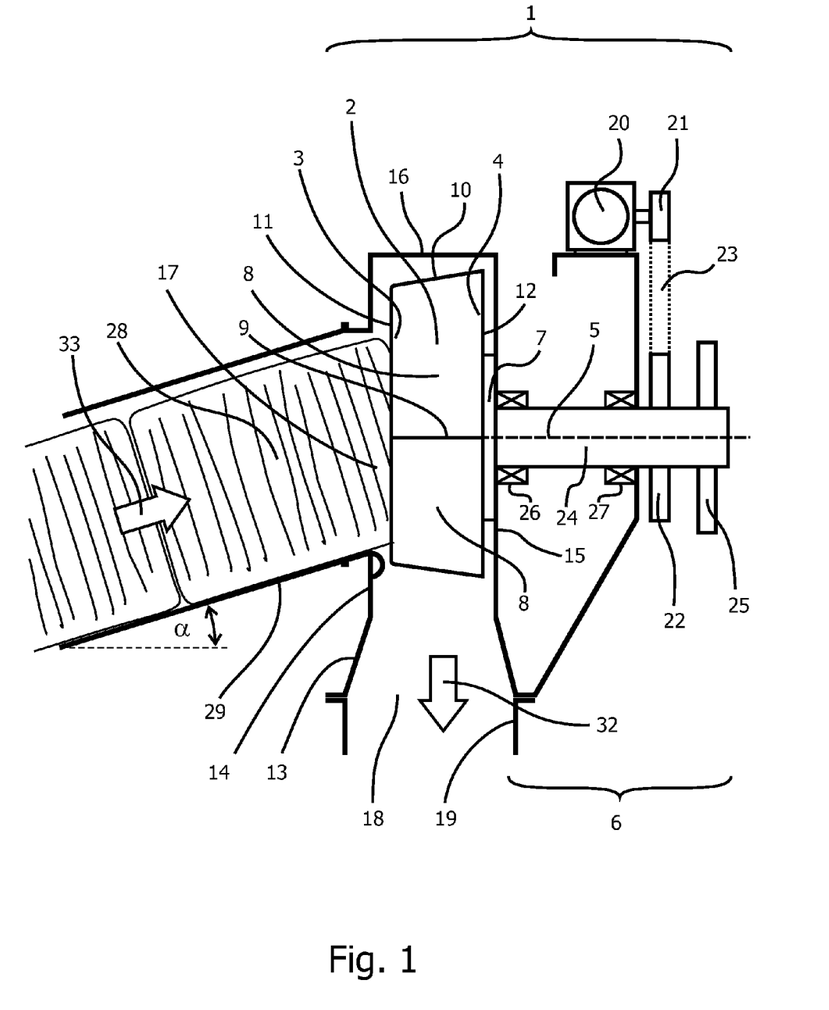
Figure 2:
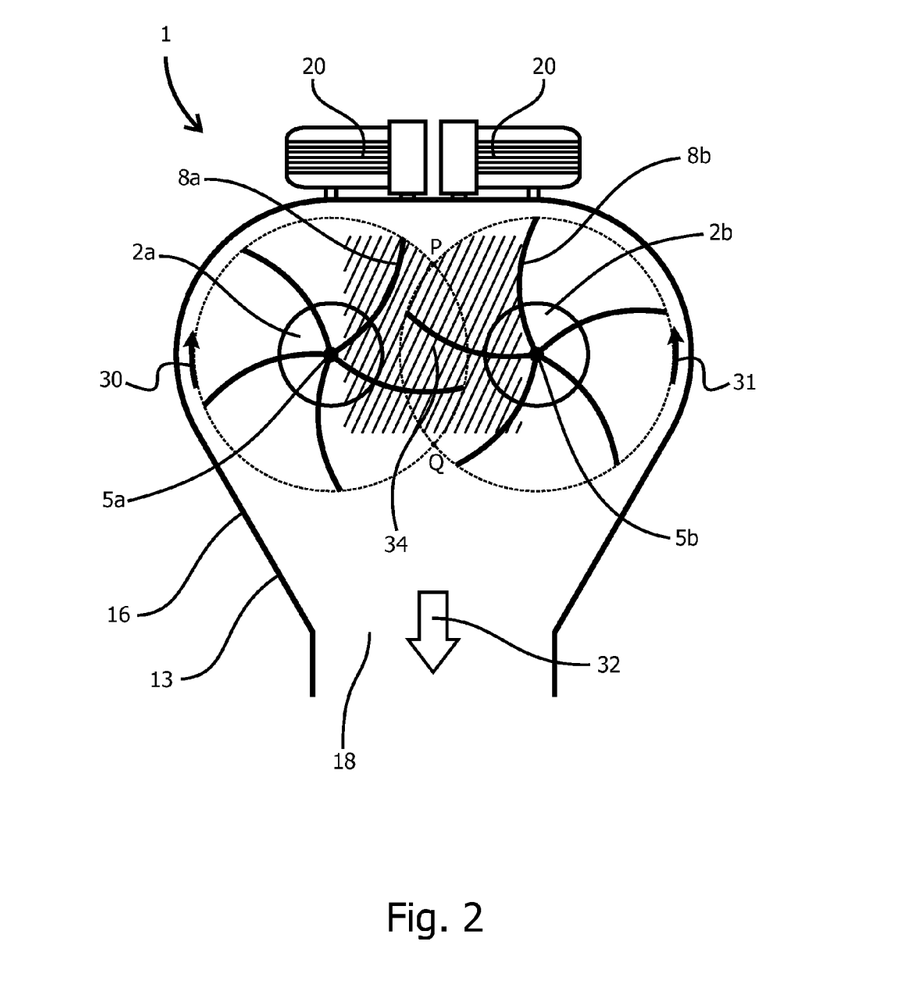

FIG. 1 and FIG. 2 show a bale opener 1 according to one embodiment of the invention. The bale opener comprises two disintegration members 2 having a first end 3 and a second end 4. The disintegration members are rotatable around a rotation axis 5 defining an axial direction and are at their second end 4 connected to a drive system 6 for driving the rotational motion of the disintegration members 2.

Attached to a back plate 7 that is located at the second end 4, the disintegration members 2 comprise a number of curved blades 8 extending outwardly from a radially inner edge 9, here essentially located at the rotation axis 5, to a radially outer edge 10 at the periphery of the disintegration member 2. In the direction from the first end to the second end, the blades extend from a first edge 11 at the first end 3 to a second edge 12 at the second end 4 of the disintegration members 2. The radially outer edge 10 may be inclined with respect to the rotation axis 5, for example converging towards the rotation axis 5 as seen in the direction from the second end 4 towards the first end 3.

The disintegration members 2 are arranged in a housing 13 with a front cover 14, a rear wall 15 and a side wall 16. An inlet opening 17 is provided in the front cover 14 of the housing 13 and is arranged opposite the first end 3 of the disintegration members 2. Underneath the disintegration members 2, an outlet opening is provided leading to the intake 19 of a production unit of a biomass energy plant (not shown).

A drive system 6 is arranged outside the housing 13 at the rear. The disintegration members 2 are driven by a motor 20, which—via a power transmission, such as a chain drive with sprockets 21, 22 and a chain 23—acts on a drive shaft 24 connected to the back plate 7 of the disintegration members 2. The drive shafts 24 are supported by bearings 26, 27 in a frame attached to the rear side of the housing 13.

Referring to FIG. 2, the disintegration members 2a and 2b are driven in a counter rotating manner as indicated by arrows 30, 31 so as to provide a downward movement of the blades 8a, 8b of both disintegration members 2a, 2b in the direction towards the outlet opening 18 in the region between the rotation axes 5a, 5b. The movement of the disintegration members is synchronised by cooperating synchronisation gears 25 arranged on the drive shafts 24 (both shown in FIG. 1) so as to allow the blades 8a, 8b of the disintegration members 2a, 2b to gear into each other in an overlap region between intersection points P, Q without touching each other.

In the embodiment shown in FIG. 2, each of the disintegration members 2a, 2b carries five blades 8a, 8b. The blades 8a, 8b are curved in the radial direction with a curvature that is convex in the direction of the movement of the blades 8a, 8b, i.e. in the direction of rotation 30, 31. Due to the interaction between the blades and the bale, the curved shape improves the strength of the blades 8a, 8b to withstand forces acting on the blades 8a, 8b in a direction opposite the direction of rotation 30, 31. Furthermore, being convex in the direction of motion facilitates the discharge of loosened material collected between the disintegration members 2a, 2b in the direction of arrow 32.

When used in a feeding line of a biomass energy plant, the inlet 17 of the bale opener 1 is mounted to the end of a feeding channel 29 through which bales 28 of compacted biomaterial, such as straw, are conveyed in a feeding direction 33 towards a processing region at the first end 3 of the disintegration members 2. When the bales 28 are pushed through the inlet opening 17 to interact with the first end 3 of the disintegration members 2, the first edges 9 of the blades 8 engage the compacted layers of the bales 28 to break off and loosen biomaterial.

The region of interaction between the bales 28 and blades 8 defines the processing region 34 (hatched area in FIG. 2). Preferably, the processing region 34 is located between the rotation axes 5a and 5b of the disintegration members 2a, 2b. The processing region 34 is dimensioned to cover the full width of the bales 28 with a standardised size. To that extent, the distance between the rotation axes 5a and 5b is preferably larger than the dimension of the bale cross-section and thus of the processing region 34 in the same direction.

In the embodiment shown in FIG. 2, the overlap of the disintegration members 2a, 2b is chosen such that the distance between the intersection-points P, Q of the overlap region is smaller than the dimension of the bale cross-section and thus of the processing area 34 in the same direction.

In order to avoid that large lumps or even complete layers of compacted biomaterial are broken off the bales 28 when they are being processed, the bales are fed to the processing region 34 in a feeding direction 33. The bales 28 may be guided in the feeding direction 33 by a feeding channel 29 connected to the inlet opening 17 of the housing 13. The feeding channel 29 is inclined in an upward direction as seen in the direction towards the inlet opening, i.e. as seen in the feeding direction 33. For commonly available straw bales of the "Hesston"-type, an angle α of about 17 degrees has turned out to work well in practice.

After processing in the processing region 34, the loosened material falls in the volume adjacent to the processing region located between the disintegration members, is collected and carried along by the movement of the blades, and is finally released in a transport direction 32 towards the outlet 18 of the bale opener 1.

For safety reasons, the rotational speed of the disintegration members should be limited such that the tangential velocity of the radially outer edges of the blades does not exceed about 2 m/s. It should also be noted, that straw bales may contain contaminants in the form of stones, such as flint stone. When the blades hit such stones at a certain minimum speed, there is a considerable risk of spark formation with a serious fire hazard as a consequence, since the spark might ignite the straw. Typical drive speeds are therefore about 1 m/s at the periphery of the disintegration members.

Figure 3:
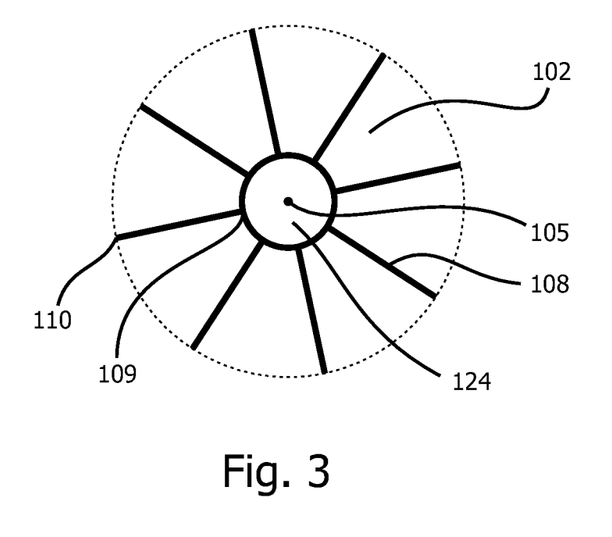

FIG. 3 illustrates schematically an embodiment of a disintegration member for a bale opener according to the invention. The disintegration wheel 102 shown in FIG. 3 is rotatable around a rotation axis 105 and is equipped with eight blades 108 radiating outwardly from a hub 124. The blades 108 are shaped as planar plates.

Figure 4:
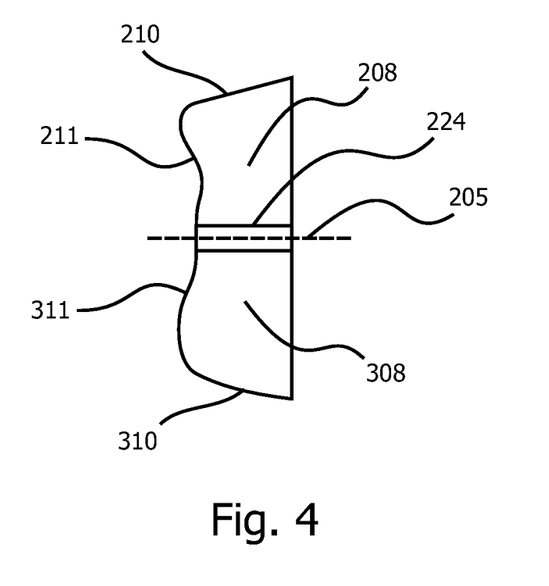

FIG. 4 shows a side view of a disintegration member that is provided with different blades 208, 308 arranged on a drive shaft 224 for rotation around a rotation axis 205 having differently shaped first edges forming different processing profiles 211, 311. The processing profiles 211, 311 may be a combination of linear and curved shapes that are connected to form a preferably blunt profile. The shapes are adapted to work the bale fed to the first end of the disintegration member as the blades are swept across the surface of the bale, thereby breaking the internal structure of the bale and loosening the compressed biomaterial. The shapes of the processing profile 211 and the processing profile 311 project at different distances from the rotation axis 205 so as to alternately work different parts of the bale and enhance the massaging effect of the processing profiles 211, 311.

The radially outer edges 210, 310 of the blades 208, 308 are smoothly shaped and inclined towards the rotation axis so as to allow bale strings that may get caught on the periphery of the disintegration member to slide off towards the first end of the disintegration member.

LIST OF REFERENCE NUMBERS 1 bale opener
2, 2a, 2b, 102 disintegration member
3 first end
4 second end
5, 5a, 5b, 105, 205 rotation axis
6 drive system
7 back plate
8, 8a, 8b, 108, 208, 308 blade
9, 109 radially inner edge
10, 110, 210, 310 radially outer edge
11, 211, 311 first edge
12 second edge
13 housing
14 front cover
15 rear wall
16 side wall
17 inlet
18 outlet
19 intake
20 motor
21, 22 sprocket
23 chain
24, 124, 224 drive shaft
25 synchronisation gear
26, 27 bearing
28 bale
29 feeding channel
30, 31 direction of rotation
32 transport direction
33 feeding direction
34 processing region
P,Q intersection points
α feeding angle

The invention claimed is:

1. Bale opener for use in a feeding line of a biomass energy plant, the bale opener (1) comprising
at least two disintegration members (2), wherein each disintegration member (2) is rotatable around a respective rotation axis (5) and in the direction of that rotation axis (5) has a first end (3) and a second end (4),
an inlet (17) for feeding bales (28) in a feeding direction (33) to the disintegration members (2),
an outlet (18) for discharging loosened bale material from the disintegration members (2), and
a drive system (6) being operable to drive the disintegration members (2) to rotate around their respective rotation axis (5),
wherein each disintegration member (2) is provided with a plurality of blades (8) radially arranged around the rotation axis (5) such that a body of the blades (8) extend in an outward direction from the rotation axis (5) and in a direction along the rotation axis (5),
the blades (8) extending outwardly from a radially inner edge (9) to a radially outer edge (10) and from a first edge (11) at the first end (3) to a second edge (12) in a direction towards the second end (4), wherein under operation the first edges (11) are moved in a direction of rotation of the disintegration members (2) so as to sweep the first edges (11) in a scraping movement across the cross-section of the bales (28), and that the inlet (17) is arranged opposite the first end (3) of the disintegration members (2) so as to feed the bales (28) to a processing region (34) at the first end (3) of the disintegration members (2).

2. Bale opener according to claim 1, characterised in that the blades (8) are planar plates.

3. Bale opener according to claim 1, characterised in that the blades (8) are curved plates forming a convex surface.

4. Bale opener according to claim 1, wherein the first edges (11) of the blades (8) are provided with a number of indentations and/or projections defining a blunt processing profile for engaging with the bale and/or for breaking bale strings.

5. Bale opener according to claim 1, wherein the number of blades (8) is between two and ten.

6. Bale opener according to claim 1, having two disintegration members (2a, 2b), wherein the two disintegration members are arranged so as to gear into each other such that the distance between the rotation axes of the two disintegration members is shorter than two times a length of a blade under operation in order to sweep the blades (8a, 8b) of both disintegration members (2a, 2b) through an overlap volume.

7. Bale opener according to claim 6, wherein the disintegration members (2a, 2b) have substantially parallel rotation axes (5a, 5b).

8. Bale opener according to claim 6, wherein means (25) for synchronising the movement of the two disintegration members are provided in the drive system (6).

9. Bale opener according to claim 6, wherein the processing region (34) is located between the rotation axes (5a, 5b).

10. Bale opener according to claim 1, wherein the disintegration members (2) are arranged inside a housing (13) having a first opening and a second opening, the first opening of the housing (13) forming the inlet (17) of the bale opener (1) opposite the first end (3) of the disintegration members (2) and the second opening in the housing (13) forming the outlet (18) of the bale opener (1).

11. Bale opener according to claim 10, wherein the drive system (6) is arranged on the outside of the housing (13).

12. Bale opener according to claim 1, wherein a feeding channel (29) is provided in connection with the inlet (17), the feeding channel (29) defining the feeding direction (33).

13. Bale opener according to claim 1, wherein the rotation axis (5) of the disintegration members (2) is arranged horizontally and the feeding direction (33) is inclined in an upward direction thereto as seen in the direction towards the inlet (17).

14. Bale opener according to claim 13, wherein the angle ($\alpha$) between the feeding direction (33) and the rotation axis (5) is between 15 degrees and 20 degrees.

15. Bale opener according to claim 13, wherein the angle ($\alpha$) between the feeding direction (33) and the rotation axis (5) is about 17 degrees.

16. Bale opener according to claim 13, wherein the angle ($\alpha$) between the feeding direction (33) and the rotation axis (5) is between 10 degrees and 30 degrees.

17. Feeding line of a biomass energy plant, the feeding line comprising a bale opener (1) according to claim 1.

18. Bale opener according to claim 1, characterised in that the blades (8) are curved plates forming a convex surface in the direction of rotation (30, 31).

19. Bale opener according to claim 1, wherein the number of blades (8) is between between four and six.

* * * * *